United States Patent
Gao et al.

(10) Patent No.: US 12,502,868 B2
(45) Date of Patent: Dec. 23, 2025

(54) FOLDABLE DISPLAY SCREEN AND MANUFACTURING METHOD THEREOF, AND DISPLAY APPARATUS

(71) Applicant: BOE TECHNOLOGY GROUP CO., LTD., Beijing (CN)

(72) Inventors: Meiling Gao, Beijing (CN); Zhao Li, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 81 days.

(21) Appl. No.: 16/957,431

(22) PCT Filed: Aug. 19, 2019

(86) PCT No.: PCT/CN2019/101416
§ 371 (c)(1),
(2) Date: Jun. 24, 2020

(87) PCT Pub. No.: WO2021/031080
PCT Pub. Date: Feb. 25, 2021

(65) Prior Publication Data
US 2022/0390983 A1 Dec. 8, 2022

(51) Int. Cl.
*B32B 7/05* (2019.01)
*B32B 7/12* (2006.01)
(Continued)

(52) U.S. Cl.
CPC .................. *B32B 7/05* (2019.01); *B32B 7/12* (2013.01); *B32B 37/12* (2013.01); *G02B 1/14* (2015.01);
(Continued)

(58) Field of Classification Search
CPC .... B32B 7/05; B32B 7/12; B32B 7/14; B32B 37/12; B32B 2457/206; B32B 15/082;
(Continued)

(56) References Cited

U.S. PATENT DOCUMENTS 10,637,007 B1 * 4/2020 Wang .................... H10K 59/131
2010/0308335 A1 * 12/2010 Kim ........................ H10K 59/12
257/59

(Continued)

*Primary Examiner* — Mark Ruthkosky
*Assistant Examiner* — Rebecca L Grusby
(74) *Attorney, Agent, or Firm* — Dilworth & Barrese, LLP.; Michael J. Musella, Esq.

(57) ABSTRACT

A foldable display screen and a manufacturing method thereof, and a display apparatus are provided. The foldable display screen includes a display panel and an optically clear adhesive (OCA) layer. The display panel includes a bending region and a non-bending region; and the bending region is configured to be bent along an axis extending in a first direction, the non-bending region is on at least one side of the bending region in a second direction. The OCA layer includes a first portion and a second portion, the first portion is in the bending region, an edge of the first portion in the first direction overlaps with an edge of the bending region in the first direction, the second portion is located in the non-bending region, and a spacing is formed between the second portion and an edge of the non-bending region in the first direction.

12 Claims, 3 Drawing Sheets

(51) Int. Cl.
    *B32B 37/12*  (2006.01)
    *G02B 1/04*   (2006.01)
    *G02B 1/11*   (2015.01)
    *G02B 1/14*   (2015.01)
    *G06F 3/041*  (2006.01)
    *H10K 59/12*  (2023.01)
    *H10K 59/40*  (2023.01)

(52) U.S. Cl.
    CPC ............ *G06F 3/0412* (2013.01); *H10K 59/40* (2023.02); *B32B 2307/412* (2013.01); *B32B 2307/42* (2013.01); *B32B 2307/51* (2013.01); *B32B 2307/732* (2013.01); *B32B 2457/208* (2013.01); *G02B 1/04* (2013.01); *G02B 1/11* (2013.01); *H10K 59/1201* (2023.02)

(58) Field of Classification Search
    CPC ..... B32B 15/092; B32B 15/095; B32B 27/08; B32B 27/281; B32B 27/283; B32B 27/308; B32B 27/36; B32B 27/38; B32B 27/40; G06F 1/1652; G06F 1/1616; G06F 1/1618; G06F 1/162; H10K 59/40; H10K 77/111; H10K 2102/311; H10K 77/10; G02F 1/33305; G09F 9/301; H04M 1/0268; H04M 1/0269

See application file for complete search history.

(56) References Cited

U.S. PATENT DOCUMENTS

| | | | |
|---|---|---|---|
| 2013/0094160 A1* | 4/2013 | Narumi | G02F 1/133308 361/752 |
| 2015/0314561 A1* | 11/2015 | Kim | B32B 27/08 156/60 |
| 2016/0037656 A1* | 2/2016 | Kim | G06F 1/1656 361/679.01 |
| 2016/0338219 A1* | 11/2016 | Seo | G02F 1/133308 |
| 2017/0147117 A1* | 5/2017 | Song | G06F 3/0443 |
| 2019/0033918 A1* | 1/2019 | Park | G06F 1/1643 |
| 2019/0101784 A1* | 4/2019 | Shin | H04M 1/0268 |
| 2019/0361286 A1* | 11/2019 | Jang | G02F 1/133308 |
| 2020/0051881 A1* | 2/2020 | Park | B32B 3/04 |
| 2020/0136067 A1* | 4/2020 | Kim | H10K 50/844 |
| 2021/0234106 A1* | 7/2021 | Zhu | H10K 71/00 |
| 2021/0410306 A1* | 12/2021 | Xia | H05K 5/03 |

\* cited by examiner

FOLDABLE DISPLAY SCREEN AND MANUFACTURING METHOD THEREOF, AND DISPLAY APPARATUS

TECHNICAL FIELD

Embodiments of the present disclosure relate to a foldable display screen and a manufacturing method thereof, and a display apparatus.

BACKGROUND

Currently, a smart phone has become one of the most important terminal devices in people's work and life. With continuous development of a smart phone market, in order to have advantages of portability, a large-sized screen and the like, a foldable phone has gradually become a research hotspot of major manufacturers. Generally, the foldable phone includes a foldable display screen; and the foldable display screen can be folded in the middle of the screen, so that the foldable display screen can have two states, i.e., a folded state and an unfolded state. When the foldable display screen is in the folded state, the foldable phone occupies a small area so as to facilitate carrying and operating with one single hand; and when the foldable display screen is in the unfolded state, the foldable phone has a relatively large display region so as to have better visual experience and richer functions.

Generally speaking, the foldable display screen usually can be divided into a foldable display screen bent inwards and a foldable display screen bent outwards. The foldable display screen bent inwards refers to a case that a bending direction of the foldable display screen is a light emitting direction of the foldable display screen, so that light emitting surfaces of both sides of a bending region face each other; and the foldable display screen bent outwards refers to a case that a bending direction of the foldable display screen is a direction opposite to a light emitting direction of the foldable display screen, so that light emitting surfaces of both sides of a bending region face away from each other.

SUMMARY

Embodiments of the disclosure provide a foldable display screen and a manufacturing method thereof, and a display apparatus. By arranging different sizes of OCAs in the bending region and the non-bending region, the foldable display screen not only can avoid a case that a film layer with low tolerance in the foldable display screen generates the defects of cracks and the like, but also can reduce and even avoid a phenomenon of adhesive overflow.

At least one embodiment of the disclosure provides a foldable display screen, comprising: a display panel, including a bending region and a non-bending region; and an optically clear adhesive (OCA) layer on the display panel, wherein the bending region is configured to be bent along an axis extending in a first direction, the non-bending region is on at least one side of the bending region in a second direction, the second direction is perpendicular to the first direction, the OCA layer includes a first portion and a second portion, the first portion is in the bending region, an edge of the first portion in the first direction overlaps with an edge of the bending region in the first direction, the second portion is in the non-bending region, and a spacing is formed between the second portion and an edge of the non-bending region in the first direction.

For example, in the foldable display screen provided by an embodiment of the disclosure, a size of the first portion in the first direction is the same as a size of the bending region in the first direction, and a size of the second portion in the first direction is smaller than a size of the non-bending region in the first direction.

For example, in the foldable display screen provided by an embodiment of the disclosure, a size of the spacing in the first direction is ranged from 0.1 mm to 0.5 mm.

For example, in the foldable display screen provided by an embodiment of the disclosure, the size of the spacing in the first direction is ranged from 0.15 mm to 0.25 mm.

For example, in the foldable display screen provided by an embodiment of the disclosure, a planar shape of the OCA layer includes a rectangle and two rectangular protrusions on both sides of the rectangle, and the two rectangular protrusions are respectively at two edges of the bending region in the first direction.

For example, in the foldable display screen provided by an embodiment of the disclosure, the two rectangular protrusions are mirror-symmetric about a bisector of the bending region in the second direction.

For example, in the foldable display screen provided by an embodiment of the disclosure, in a state that the foldable display screen is unfolded, the non-bending region is on both sides of the bending region in the second direction.

For example, in the foldable display screen provided by an embodiment of the disclosure, a thickness of the OCA layer is ranged from 40 microns to 60 microns.

For example, in the foldable display screen provided by an embodiment of the disclosure, a material of the OCA layer includes at least one selected from the group consisting of organic silica gel, acrylic acid type resin, polyurethane and epoxy resin.

For example, the foldable display screen provided by an embodiment of the disclosure further comprises: a covering protective layer on a side of the OCA layer, which is away from the display panel, the OCA layer being configured to adhere the covering protective layer onto the display panel.

For example, the foldable display screen provided by an embodiment of the disclosure comprises: a touch layer on the display panel; an anti-reflective layer on a side of the touch layer, which is away from the display panel; a first OCA layer on a side of the anti-reflective layer, which is away from the touch layer; a covering protective layer on a side of the first OCA layer, which is away from the anti-reflective layer; a second OCA layer on a side of the display panel, which is away from the touch layer; a bottom film on a side of the second OCA layer, which is away from the display panel; and a supporting plate on a side of the bottom film, which is away from the display panel, wherein at least one of the first OCA layer and the second OCA layer is the OCA layer.

For example, in the foldable display screen provided by an embodiment of the disclosure, a neutral layer of the foldable display screen includes at least one of the display panel and the touch layer.

For example, the foldable display screen provided by an embodiment of the disclosure further comprises: a first adhesive layer between the anti-reflective layer and the touch layer; and a second adhesive layer between the touch layer and the display panel.

For example, in the foldable display screen provided by an embodiment of the disclosure, the display panel includes an organic light emitting diode display panel, the organic light emitting diode display panel includes a light emitting layer and a packaging layer covering the light emitting layer, and the neutral layer includes at least one of the light emitting layer, the packaging layer and the touch layer.

For example, in the foldable display screen provided by an embodiment of the disclosure, the supporting plate includes a stainless steel sheet.

At least one embodiment of the disclosure provides a display apparatus, comprising the foldable display screen according to any embodiments mentioned above.

At least one embodiment of the disclosure provides a manufacturing method of a foldable display screen, comprising: providing a display panel which includes a bending region and a non-bending region, the bending region being configured to be bent along an axis extending in a first direction, the non-bending region being on at least one side of the bending region in a second direction, and the second direction being perpendicular to the first direction; adhering an optically clear adhesive (OCA) layer onto the display panel; and adhering a covering protective layer to a side of the OCA layer, which is away from the display panel, wherein the OCA layer includes a first portion and a second portion, the first portion is in the bending region, an edge of the first portion in the first direction overlaps with an edge of the bending region in the first direction, the second portion is in the non-bending region, and a spacing is formed between the second portion and an edge of the non-bending region in the first direction.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise specified, the technical terms or scientific terms used in the disclosure shall have normal meanings understood by those skilled in the art. The words "first", "second" and the like used in the disclosure do not indicate the sequence, the number or the importance but are only used for distinguishing different components. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly.

Figure 1:
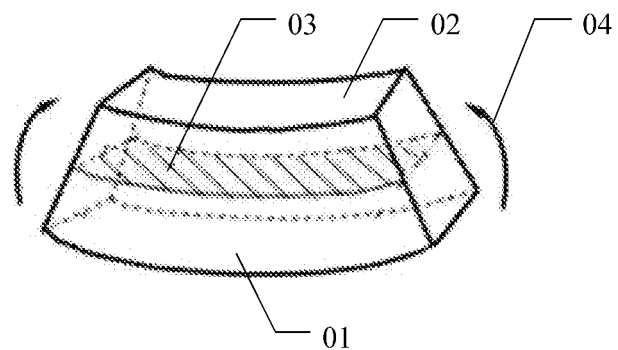
FIG. 1 is a schematic diagram of force on a material upon being bent.

FIG. 1 is a schematic diagram of force on a material upon being bent. As shown in FIG. 1, in a bending process of the material, an outer layer 01 is stretched, and an inner layer 02 is squeezed; inevitably, on a cross section of the material, there is a transition layer 03 which is neither applied with a tensile force nor a pressure, i.e., a stress of the transition layer is nearly equal to zero; and the transition layer 03 is referred to as a neutral layer 03 of the material. A length of the neutral layer 03 in the bending process of the material is maintained unchanged, so that the neutral layer cannot be damaged by the tensile force or the pressure. It should be noted that the above-mentioned "outer layer" and "inner layer" are sequentially arranged in a bending direction 04 of the material.

Similar to a common display screen, a foldable display screen may also include a display panel, a covering protective layer and an Optically Clear Adhesive (OCA) for adhering the display panel to the covering protective layer. The OCA layer is a film layer for adhering a transparent optical element, e.g., the covering protective layer (Cover), to the display panel, and has the advantages of no color, transparency, high light transmittance, excellent adhesion strength, small curing shrinkage and the like. However, an inventor of the application notes that the foldable display screen needs to be bent, and thus, if a size of the OCA layer is smaller than a size of the display panel, in the process of bending the foldable display screen, a region on the foldable display screen, where the OCA layer is arranged, is different in stress condition from a region on the foldable display screen, where the OCA layer is not arranged, resulting in a change of a position of the neutral layer of the region on the foldable display screen, where the OCA layer is not arranged, so that it is possible that a film layer with low tolerance in the foldable display screen is located outside the neutral layer and then generate defects of cracks and the like; and on the other hand, if the size of the OCA layer is the same as the size of the display panel, in the process of adhering the covering protective layer to the display panel by using the OCA layer, it is possible to generate defects of adhesive overflow and the like.

In this regard, embodiments of the present disclosure provide a foldable display screen and a display apparatus. The foldable display screen includes a display panel and an OCA layer. The display panel includes a bending region and a non-bending region; and the OCA layer is located on the display panel, the bending region is configured to be bent along an axis extending in a first direction, the non-bending region is located on at least one side of the bending region in a second direction, the second direction is perpendicular to the first direction, the OCA layer includes a first portion and a second portion, the first portion is located in the bending region, an edge of the first portion in the first direction overlaps with an edge of the bending region in the first direction, the second portion is located in the non-bending region, and a spacing is formed between the second portion and an edge of the non-bending region in the first direction. By arranging different sizes of OCAs in the bending region and the non-bending region, the foldable display screen not only can avoid a case that a film layer with low tolerance in the foldable display screen generates the defects of cracks and the like, but also can reduce and even avoid a phenomenon of adhesive overflow.

The foldable display screen and the display apparatus, as provided by the embodiments of the present disclosure, will be illustrated in detail below in connection of the drawings.

Figure 2:
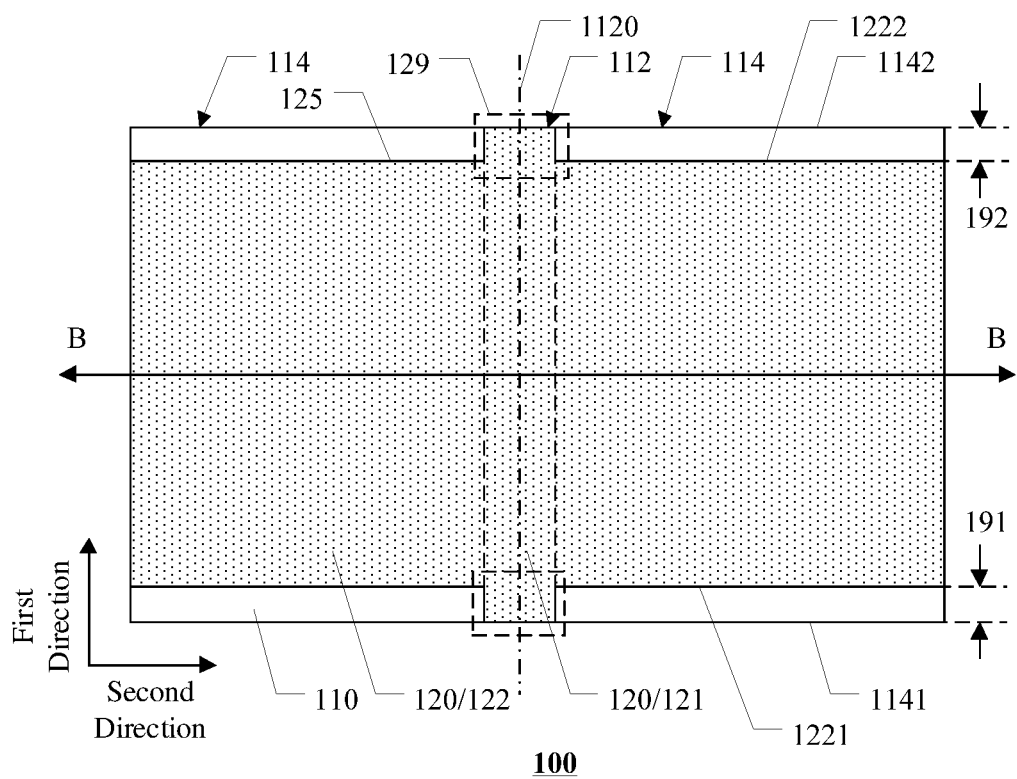
FIG. 2 is a planar schematic diagram of a foldable display screen provided by one embodiment of the present disclosure.

FIG. 2 is a planar schematic diagram of a foldable display screen provided by one embodiment of the present disclosure. As shown in FIG. 2, the foldable display screen 100 includes a display panel 110 and an OCA layer 120; the OCA layer 120 is arranged on the display panel 110, and the OCA layer 120 can be used for adhering a covering protective layer onto the display panel 110; the display panel 110 includes a bending region 112 and a non-bending region 114; and the bending region 112 can be bent along an axis 1120 extending in a first direction, the non-bending region 114 is located on at least one side of the bending region 114 in a second direction, and the second direction is perpendicular to the first direction. The OCA layer 120 includes a first portion 121 and a second portion 122, the first portion 121 is located in the bending region 112, an edge of the first portion 121 in the first direction overlaps with an edge of the bending region 112 in the first direction, the second portion 122 is located in the non-bending region 114, and a spacing is formed between the second portion 122 and an edge of the non-bending region 114 in the first direction; in other words, the second portion 122 corresponds to the non-bending region 114 of the display panel 110, and the second portion 122 has an internal shrinking design with respect to the non-bending region 114. It should be noted that FIG. 2 shows the planar schematic diagram in which the foldable display screen is in an unfolded state; and when the foldable display screen is in a bent state, a positional relationship of the bending region and the non-bending region can be correspondingly changed.

For example, the axis 1120 may be a virtual axis, or may be an actual rotating shaft, which is not particularly limited in the embodiments of the present disclosure. For example, bending along the axis 1120 may be bending the bending region along a circumferential direction of the axis.

In the foldable display screen provided by the embodiment of the present disclosure, the edge of the first portion in the first direction overlaps with the edge of the bending region in the first direction, and thus, the foldable display screen can avoid the case that the film layer with low tolerance in the foldable display screen generates the defects of cracks and the like in the folding process; and the spacing is formed between the second portion of the OCA layer and the edge of the non-bending region in the first direction, and thus, the spacing can avoid the phenomenon of adhesive overflow in the non-bending region of the foldable display screen. Therefore, by arranging different sizes of OCAs in the bending region and the non-bending region, the foldable display screen not only can avoid the case that the film layer with low tolerance in the foldable display screen generates the defects of cracks and the like, but also can reduce and even avoid the phenomenon of adhesive overflow. It should be noted that compared to the non-bending region, the bending region of the foldable display screen has a relatively small area, so that even though a certain phenomenon of adhesive overflow occurs in the bending region, the overall foldable display screen is also influenced little.

For example, as shown in FIG. 2, an orthogonal projection of the first portion 121 on the display panel 110 completely overlaps with the bending region 112, i.e., the first portion 121 corresponds to the bending region 112 of the display panel 110, and a size of the first portion 121 is roughly equal to a size of the bending region 112 of the display panel 110; and an orthogonal projection of the second portion 122 on the display panel falls into the non-bending region 114, and the spacing is formed between the orthogonal projection of the second portion 122 and the edge of the non-bending region 114 in the first direction.

In some examples, as shown in FIG. 2, the size of the first portion 121 of the OCA layer 120 in the first direction is the same as the size of the bending region 112 of the display panel 110 in the first direction. In this case, all the bending region 112 of the display panel 110 is provided with the OCA layer 120, and thus, the bending region 112 of the display panel 110 is the same in stress condition in the bending process, so that it can be avoided that the film layer with low tolerance in the foldable display screen is located outside a neutral layer and then the defects of cracks and the like are generated.

In some examples, as shown in FIG. 2, a size of a second portion 122 of the OCA layer 120 in the first direction is smaller than a size of the non-bending region 114 of the display panel 110 in the first direction. At the moment, the non-bending region 114 of the display panel 110 is not liable to generate the defects of adhesive overflow and the like.

In some examples, as shown in FIG. 2, the edge of the non-bending region 114 of the display panel 110 in the first direction includes a first edge 1141 and a second edge 1142; and the orthogonal projection of the second portion 122 of the OCA layer 120 on the display panel 110 includes a third edge 1221 opposite to the first edge 1141 and a fourth edge 1222 opposite to the second edge 1142 in the first direction, a first spacing 191 is formed between the third edge 1221 and the first edge 1141, and a second spacing 192 is formed between the fourth edge 1222 and the second edge 1142. Therefore, the first spacing 191 and the second spacing 192 can effectively avoid the phenomenon of adhesive overflow.

The above has been illustrated by taking a case that the first spacing 191 and the second spacing 192 coexist as an example, however, the embodiments of the present disclosure are not limited thereto. For example, a spacing may also be formed between the OCA layer 120 and at least one of the first edge 1141 and the second edge 1142.

In some examples, a size range of the spacing (for example, the first spacing 191 and the second spacing 192) in the first direction is 0.1 to 0.5 mm. It should be noted that a size of the first spacing in the first direction and a size of the second spacing in the first direction may be the same or different.

In some examples, the size range of the spacing (for example, the first spacing 191 and the second spacing 192) in the first direction is 0.15 to 0.25 mm. For example, the spacing may be 0.2 mm.

In some examples, as shown in FIG. 2, when the foldable display screen 100 is in the unfolded state, the non-bending region 114 of the display panel 110 can be located on both sides of the bending region 112 in the second direction. At the moment, after the foldable display screen 100 provided by the embodiment of the present disclosure is externally bent, i.e., when the foldable display screen 100 is in an external bent state, either of two non-bending regions 114 and a portion of the bending region 112, which is close to the non-bending region 114, can be used as one independent sub display screen so as to display an image. At the moment, the foldable display screen can display one image on one side, and can also simultaneously display two images on both sides. When the foldable display screen 100 provided by the embodiment of the present disclosure is in the unfolded state, two non-bending regions 114 and the bending region 112 between the two non-bending regions 114 can display one image together, and can also display different images in a split screen mode, and the embodiments of the present disclosure include, but are not limited thereto.

For example, one of the two images can be used as a main image, while the other one can be used as a virtual keyboard, so that operation control experience of a user can be improved.

For example, one of the two images can be an image output by one program, while the other one can be an image output by another program, so that multifunctional processing can be implemented.

In some examples, a thickness range of the OCA layer 120 is 40 to 60 microns.

In some examples, a material of the OCA layer 120 includes at least one of organic silica gel, acrylic acid type resin, polyurethane and epoxy resin.

In some examples, as shown in FIG. 2, a planar shape of the OCA layer 120 includes a rectangle 125 and two rectangular protrusions 129 located on both sides of the rectangle 125, and the two rectangular protrusions 129 are respectively located at two edges of the bending region 112 in the first direction.

In some example, as shown in FIG. 2, two rectangular protrusions 129 are mirror-symmetric about a bisector of the bending region 112 in the second direction. In some examples, as shown in FIG. 2, an edge of the rectangular protrusion 129, which is away from the center of the OCA layer 120, overlaps or is parallel and level with an edge of the display panel 110 in the first direction.

Figure 3:
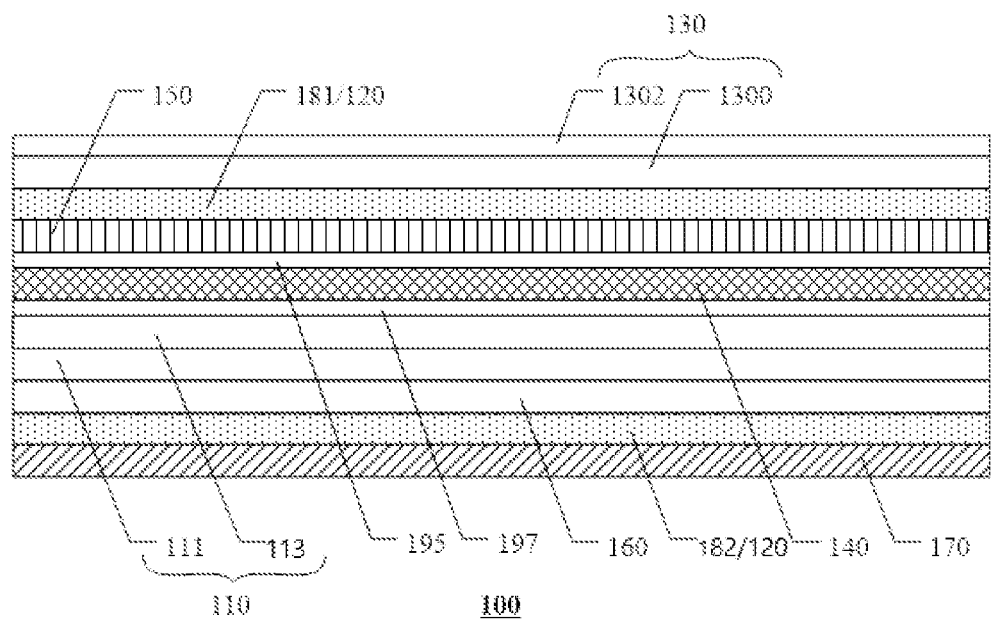
FIG. 3 is a section-view schematic diagram of a foldable display screen provided by one embodiment of the present disclosure.

FIG. 3 is a section-view schematic diagram of a foldable display screen provided by one embodiment of the present disclosure. As shown in FIG. 3, the foldable display screen 100 further includes: a covering protective layer 130, located on one side of the OCA layer 120, which is away from the display panel 110, the OCA layer 120 being used for adhering the covering protective layer 130 onto the display panel 110.

For example, the foldable display screen 100 further includes a bottom film 160, and the OCA layer 120 is located on one side of the display panel 110, which is away from the bottom film 160.

In some examples, the foldable display screen 100 further includes: a touch layer 140, located on the display panel 110; an anti-reflective layer 150, located on one side of the touch layer 140, which is away from the display panel 110; a first OCA layer 181, located on one side of the anti-reflective layer 150, which is away from the touch layer 140; the covering protective layer 130, located on one side of the first OCA layer 181, which is away from the anti-reflective layer 150; a second OCA layer 182, located on one side of the display panel 110, which is away from the touch layer 140; the bottom film 160, located on one side of the second OCA layer 182, which is away from the display panel 110; and a supporting plate 170, located on one side of the bottom film 160, which is away from the display panel 110, at least one of the first OCA layer 181 and the second OCA layer 182 being the OCA layer 120, i.e., at least one of the first OCA layer 181 and the second OCA layer 182 adopting the OCA layer 120.

In some examples, as shown in FIG. 3, the touch layer 140 is used for achieving a touch function. At the moment, the neutral layer of the foldable display screen 100 can be located on at least one of the display panel 110 and the touch layer 140, so that it can be effectively prevented that the display panel 110 and the touch layer 140 have defects of fracture and the like in the process of bending the foldable display screen 100. It should be noted that the embodiments of the present disclosure include, but are not limited to, the above-mentioned case of direct contact of the touch layer and the display panel, and further can include a case that the touch layer is adhered to the display panel by a colloid.

For example, the touch layer 140 is in direct contact with the display panel 110, i.e., the touch layer 140 is directly arranged on a packaging layer or an opposed substrate of the display panel 110, so that the integration level of the touch layer 140 and the display panel 110 can be improved. Certainly, the embodiments of the present disclosure include, but are not limited thereto, and the touch layer can also be adhered onto the display panel by an adhesive layer or the colloid. In some example, as shown in FIG. 3, the foldable display screen may further include: a first adhesive layer 195, located between the anti-reflective layer 150 and the touch layer 140 and used for adhering the anti-reflective layer 150 onto the touch layer 140. In some example, as shown in FIG. 3, the foldable display screen includes: a second adhesive layer 197, located between the touch layer 140 and the display panel 110.

For example, the first adhesive layer and the second adhesive layer can adopt a Pressure Sensitive Adhesive (PSA). Certainly, the embodiments of the present disclosure include, but are not limited thereto, and the first adhesive layer and the second adhesive layer can also adopt other adhesive layers.

For example, the touch layer may be a mutual-capacitive touch layer, or may be a self-capacitive touch layer. In addition, the touch layer can be made of transparent metallic oxide, e.g., indium tin oxide, or can also be made of a metal mesh.

In some examples, as shown in FIG. 3, the display panel 110 may be an organic light emitting diode display panel; and at the moment, the display panel 110 includes a light emitting layer 111 and a packaging layer 113 covering the light emitting layer 111, and at the moment, the neutral layer of the foldable display screen 100 includes the light emitting layer 111, the packaging layer 113 and the touch layer 140, and in other words, the neutral layer of the foldable display screen 100 is located on the light emitting layer 111, the packaging layer 113 and the touch layer 140, so that it can be effectively prevented that the light emitting layer 111, the packaging layer 113 and the touch layer 140 have the defects of fracture and the like in the process of bending the foldable display screen 100. Certainly, the display panel 110 may also be other bendable display panels, which is not limited in the embodiments of the present disclosure.

For example, the touch layer 140 is located on one side of the packaging layer 113, which is away from the light emitting layer 111, and is in direct contact with the packaging layer 113, i.e., the touch layer 140 is located on the surface of the packaging layer 113, which is away from the light emitting layer 111, so that the integration level of the touch layer 140 and the display panel 110 can be improved. Certainly, the embodiments of the present disclosure include, but are not limited thereto, and the touch layer can also be adhered onto the display panel by the adhesive layer or the colloid. In some examples, as shown in FIG. 3, the anti-reflective layer 150 can take an effect of preventing reflection of ambient light, so that display quality can be improved.

For example, the anti-reflective layer 150 may be a polarizer, e.g., a circular polarizer. It should be noted that the circular polarizer can be formed by a linear polarizer and a quarter-wave plate.

For example, the covering protective layer 130 can provide protection for the foldable display screen 100, and can be used for preventing the foldable display screen 100 from being scratched by other objects. For example, the covering protective layer 130 may include a flexible polymer layer 1300 and a hardening layer 1302.

For example, the flexible polymer layer 1300 can be selected from one or more of polyimide, polyethylene naphthalate, polyethylene terephthalate and ultra-thin glass. The hardening layer 1302 can be selected from acrylics or siloxane polymer. It should be noted that the ultra-thin glass refers to glass with a thickness range of 0.1 to 1.1 mm. For example, as shown in FIG. 3, an orthogonal projection of the flexible polymer layer 1300 on a plane where a main surface of the display panel 110 is located can completely coincide with an orthogonal projection of the hardening layer 1302 on the plane where the main surface of the display panel 110 is located. Certainly, the present disclosure includes, but is not limited thereto, and the orthogonal projection of the hardening layer 1302 on the plane where the main surface of the display panel 110 is located may also be smaller than the orthogonal projection of the flexible polymer layer 1300 on the plane where the main surface of the display panel 110 is located, i.e., falls into the orthogonal projection of the flexible polymer layer 1300 on the plane where the main surface of the display panel 110 is located. For example, the foldable display screen may include the bending region and the non-bending region, the flexible polymer layer can cover the bending region and the non-bending region, and the hardening layer can only cover the non-bending region, but not cover the bending region.

In some examples, the bottom film 160 located on one side of the display panel 110, which is away from the touch layer 140, can protect one side of the display panel 110, which is away from the touch layer 140.

In some examples, as shown in FIG. 3, the supporting plate 170 which the foldable display screen 100 includes is located on one side of the bottom film 160, which is away from the display panel 110. The display panel 110 is a flexible display panel, and thus, the supporting plate 170 can take a supporting effect on the display panel 110; and on the other hand, the supporting plate 170 can also facilitate enabling the foldable display screen 100 to be recovered to a flat state after being bent.

Figure 4:
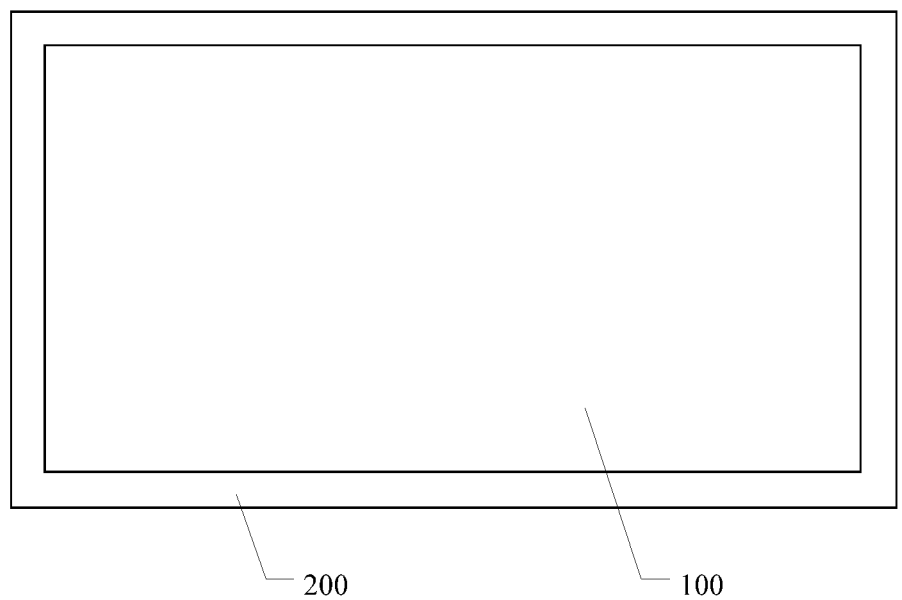
FIG. 4 is a schematic diagram of a display apparatus provided by one embodiment of the present disclosure.

For example, the supporting plate 170 may adopt a steel sheet, e.g., a stainless steel sheet. The steel sheet has high strength and good recoverability, and thus can take a good supporting effect on the display panel 110, and also facilitates enabling the foldable display screen 100 to be recovered to the flat state after being bent. Certainly, the embodiments of the present disclosure include, but are not limited thereto, and the supporting plate 170 may also be made of other proper materials. In addition, the supporting plate may have a plurality of openings in the bending region so as to reduce a stress in the bending process. Certainly, the embodiments of the present disclosure include, but are not limited thereto, and the supporting plate may also be of a complete plate-shaped structure. One embodiment of the present disclosure further provides a display apparatus. FIG. 4 is a schematic diagram of a display apparatus provided by one embodiment of the present disclosure. As shown in FIG. 4, the display apparatus 200 includes the foldable display screen 100 provided by any one of the above-mentioned examples. Therefore, the display apparatus also has the advantageous technical effects of the display screen, i.e., according to the display apparatus, different sizes of OCAs are arranged in the bending region and the non-bending region, so that the display apparatus not only can avoid the case that the film layer with low tolerance in the foldable display screen generates the defects of cracks and the like, but also can reduce and even avoid the phenomenon of adhesive overflow.

In some examples, the display apparatus 200 may be a mobile phone. Certainly, the embodiments of the present disclosure include, but are not limited thereto, and the display apparatus 200 may also be an electronic apparatus with a display function, such as a tablet personal computer, a notebook computer, a television, a digital photo frame and the like.

Figure 5:
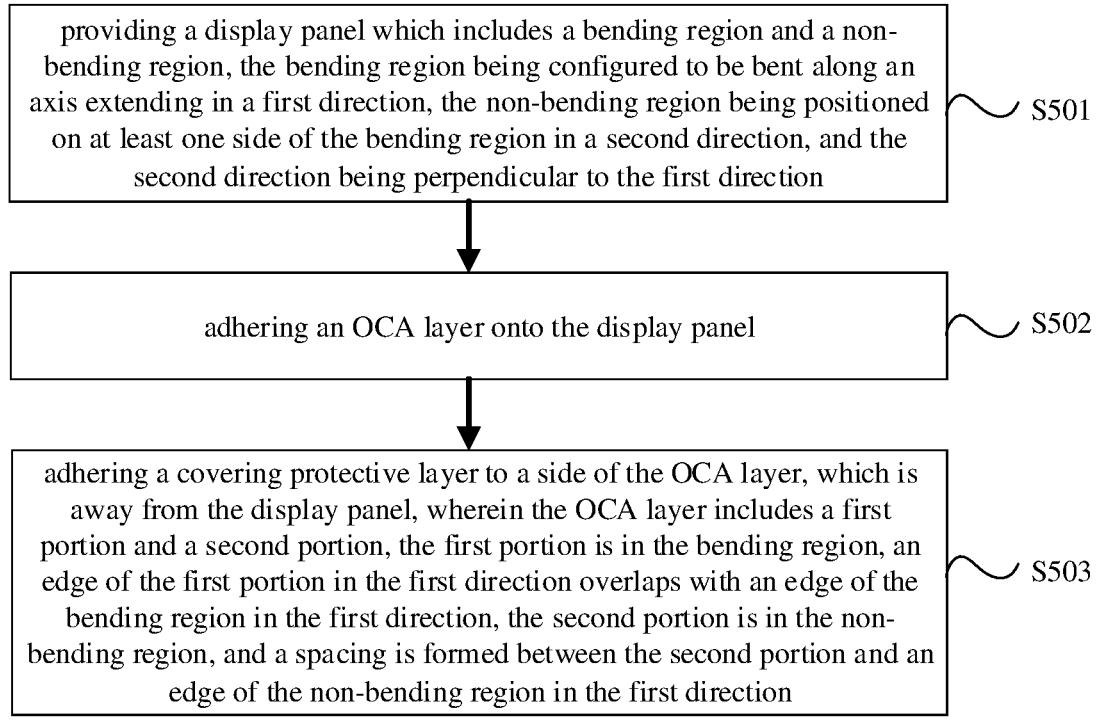
FIG. 5 is a manufacturing method of a foldable display screen, as provided by one embodiment of the present disclosure.

One embodiment of the present disclosure further provides a manufacturing method of a foldable display screen. FIG. 5 is a manufacturing method of a foldable display screen, as provided by one embodiment of the present disclosure. As shown in FIG. 5, the manufacturing method includes steps S501 to S503 as follows:

S501: providing a display panel, the display panel including a bending region and a non-bending region.

For example, the bending region of the display panel can be bent along an axis extending in a first direction, the non-bending region of the display panel is located on at least one side of the bending region in a second direction, and the second direction is perpendicular to the first direction.

S502: adhering an OCA layer onto the display panel.

S503: adhering a covering protective layer to one side of the OCA layer, which is away from the display panel, the OCA layer including a first portion and a second portion, the first portion being located in the bending region, an edge of the first portion in the first direction overlapping with an edge of the bending region in the first direction, the second portion being located in the non-bending region, and a spacing being formed between the second portion and an edge of the non-bending region in the first direction.

In the manufacturing method of the foldable display screen, as provided by the embodiment of the present disclosure, the spacing is formed between the second portion of the OCA layer and the edge of the non-bending region in the first direction, and thus, in the process of adhering the covering protective layer, the spacing can effectively avoid the phenomenon of adhesive overflow in the non-bending region of the foldable display screen. Meanwhile, an orthogonal projection of the first portion of the OCA layer on the display panel completely overlaps with the bending region, and thus, the foldable display screen can avoid the case that a film layer with low tolerance in the foldable display screen generates the defects of cracks and the like in the folding process; and therefore, by arranging different sizes of OCAs in the bending region and the non-bending region, the foldable display screen not only can avoid the case that the film layer with low tolerance in the foldable display screen generates the defects of cracks and the like, but also can reduce and even avoid the phenomenon of adhesive overflow. It should be noted that with respect to the non-bending region, the bending region of the foldable display screen has a relatively small area, so that even though a certain phenomenon of adhesive overflow occurs in the bending region, the overall foldable display screen is also influenced little.

In some examples, a size of the second portion of the OCA layer in the first direction is smaller than a size of the non-bending region of the display panel in the first direction, i.e., with respect to an edge of the non-bending region of the display panel, the second portion of the OCA layer has an internal shrinking design. At the moment, the non-bending region of the display panel is not liable to generate the defects of adhesive overflow and the like.

In some examples, a size of the first portion of the OCA layer in the first direction is the same as a size of the bending region of the display panel in the first direction. In this case, all the bending region of the display panel is provided with the OCA layer, and thus, the bending region of the display panel is the same in stress condition in the bending process, so that it can be avoided that the film layer with low tolerance in the foldable display screen is located outside a neutral layer and then the defects of cracks and the like are generated.

In some examples, a size range of the spacing in the first direction is 0.1 to 0.5 mm. For another example, the size range of the spacing in the first direction is 0.15 to 0.25 mm. For a specific structure and size of the spacing, refer to the related description in FIG. 2.

The following points should be noted:

(1) Those not involved in the embodiment of the present invention refer to the conventional design.

(2) Features in the same embodiment or different embodiments in the disclosure may be mutually combined without conflict.

The foregoing is only the preferred embodiments of the disclosure and not intended to limit the scope of protection of the disclosure. Any change or replacement that may be easily thought of by those skilled in the art within the technical scope disclosed by the disclosure shall fall within the scope of protection of the present invention. Therefore, the scope of protection of the disclosure shall be defined by the appended claims.

The invention claimed is:

1. A foldable display screen, comprising:
   a display panel, including a bending region and a non-bending region;
   an optically clear adhesive (OCA) layer on the display panel, and
   a touch layer on the display panel;
   wherein the bending region is configured to be bent along an axis extending in a first direction, the non-bending region is on both sides of the bending region in a second direction, the second direction is perpendicular to the first direction, the OCA layer includes a first portion and a second portion, the first portion is in the bending region, an edge of the first portion in the first direction overlaps with an edge of the bending region in the first direction, the second portion is in the non-bending region, and a spacing is formed between the second portion and an edge of the non-bending region in the first direction,
   wherein a size of the first portion in the first direction is the same as a size of the bending region in the first direction, and a size of the second portion in the first direction is smaller than a size of the non-bending region in the first direction, and the display panel includes an organic light emitting diode display panel, the organic light emitting diode display panel includes a light emitting layer and a packaging layer covering the light emitting layer, and a neutral layer includes the light emitting layer, the packaging layer and the touch layer located on the bending region, wherein a length of the neutral layer in a bending process is maintained unchanged, and a size of the spacing in the first direction ranges from 0.1 mm to 0.5 mm,
   in a state that the foldable display screen is in an external bent state, the non-bending region comprises a first sub non-bending region and a second sub non-bending region located on the both sides of the bending region in the second direction respectively, and both of the first sub non-bending region and a portion of the bending region which is close to the first sub non-bending region are configured to be a first sub display screen to display a first image, both of the second sub non-bending region and a portion of the bending region which is close to the second sub non-bending region are configured to be a second sub display screen to display a second image, and the first image is different from the second image.

2. The foldable display screen according to claim 1, wherein the size of the spacing in the first direction ranges from 0.15 mm to 0.25 mm.

3. The foldable display screen according to claim 1, wherein a planar shape of the OCA layer includes a rectangle and two rectangular protrusions on both sides of the rectangle, and the two rectangular protrusions are respectively at two edges of the bending region in the first direction.

4. The foldable display screen according to claim 3, wherein the two rectangular protrusions are mirror-symmetric about a bisector of the bending region in the second direction.

5. The foldable display screen according to claim 1, wherein a thickness of the OCA layer ranges from 40 microns to 60 microns.

6. The foldable display screen according to claim 1, wherein a material of the OCA layer includes at least one selected from the group consisting of organic silica gel, acrylic acid type resin, polyurethane and epoxy resin.

7. The foldable display screen according to claim 1, further comprising:
   a covering protective layer on a side of the OCA layer, which is away from the display panel, the OCA layer being configured to adhere the covering protective layer onto the display panel.

8. The foldable display screen according to claim 1, comprising:
   an anti-reflective layer on a side of the touch layer, which is away from the display panel;
   a first OCA layer on a side of the anti-reflective layer, which is away from the touch layer;
   a covering protective layer on a side of the first OCA layer, which is away from the anti-reflective layer;
   a second OCA layer on a side of the display panel, which is away from the touch layer;
   a bottom film on a side of the second OCA layer, which is away from the display panel; and
   a supporting plate on a side of the bottom film, which is away from the display panel,
   wherein at least one of the first OCA layer and the second OCA layer is the OCA layer.

9. The foldable display screen according to claim 8, further comprising:
   a first adhesive layer between the anti-reflective layer and the touch layer; and
   a second adhesive layer between the touch layer and the display panel.

10. The foldable display screen according to claim 8, wherein the supporting plate includes a stainless steel sheet.

11. A display apparatus, comprising the foldable display screen according to claim 1.

12. A manufacturing method of a foldable display screen, comprising:
   providing a display panel which includes a bending region and a non-bending region, the bending region being configured to be bent along an axis extending in a first direction, the non-bending region being on both sides of the bending region in a second direction, and the second direction being perpendicular to the first direction;

adhering an optically clear adhesive (OCA) layer onto the display panel; and adhering a covering protective layer to a side of the OCA layer, which is away from the display panel, wherein the OCA layer includes a first portion and a second portion, the first portion is in the bending region, an edge of the first portion in the first direction overlaps with an edge of the bending region in the first direction, the second portion is in the non-bending region, and a spacing is formed between the second portion and an edge of the non-bending region in the first direction, wherein a size of the first portion in the first direction is the same as a size of the bending region in the first direction, and a size of the second portion in the first direction is smaller than a size of the non-bending region in the first direction, the foldable display screen comprises a touch layer on the display panel, the display panel includes an organic light emitting diode display panel, the organic light emitting diode display panel includes a light emitting layer and a packaging layer covering the light emitting layer, and a neutral layer includes the light emitting layer, the packaging layer and the touch layer, wherein a length of the neutral layer in a bending process is maintained unchanged, and a size of the spacing in the first direction ranges from 0.1 mm to 0.5 mm, in a state that the foldable display screen is in an external bent state, the non-bending region comprises a first sub non-bending region and a second sub non-bending region located on the both sides of the bending region in the second direction respectively, and both of the first sub non-bending region and a portion of the bending region which is close to the first sub non-bending region are configured to be a first sub display screen to display a first image, both of the second sub non-bending region and a portion of the bending region which is close to the second sub non-bending region are configured to be a second sub display screen to display a second image, and the first image is different from the second image.

* * * * *